US011539597B1

(12) United States Patent
Crespo et al.

(10) Patent No.: US 11,539,597 B1
(45) Date of Patent: Dec. 27, 2022

(54) NETWORK PERFORMANCE SPREAD SERVICE

(71) Applicant: Verizon Patent and Licensing Inc., Basking Ridge, NJ (US)

(72) Inventors: Hector Alejandro Garcia Crespo, N Richland Hills, TX (US); Jason A. Birr, Lithia, FL (US); Timothy E. Coyle, Chicopee, MA (US); Luis R. Rosario, Arlington, TX (US); Matthew Kapala, North Billerica, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/518,145

(22) Filed: Nov. 3, 2021

(51) Int. Cl.
*H04L 41/142* (2022.01)
*H04L 41/0823* (2022.01)
*H04L 43/0817* (2022.01)
*H04L 43/045* (2022.01)
*H04L 41/0654* (2022.01)
*H04L 41/0813* (2022.01)

(52) U.S. Cl.
CPC ........ *H04L 41/142* (2013.01); *H04L 41/0654* (2013.01); *H04L 41/0813* (2013.01); *H04L 41/0823* (2013.01); *H04L 43/045* (2013.01); *H04L 43/0817* (2013.01)

(58) Field of Classification Search
CPC .................................................. H04L 41/142
See application file for complete search history.

(56) References Cited

U.S. PATENT DOCUMENTS

| | | | | |
|---|---|---|---|---|
| 8,364,141 | B1* | 1/2013 | Kateley | H04W 16/22 370/242 |
| 10,616,257 | B1* | 4/2020 | Soulhi | H04L 63/1425 |
| 2011/0275364 | A1* | 11/2011 | Austin | H04W 24/04 455/423 |
| 2013/0157688 | A1* | 6/2013 | Kateley | H04W 8/18 455/456.1 |
| 2013/0183983 | A1* | 7/2013 | Awad | H04W 36/0061 455/438 |
| 2014/0357260 | A1* | 12/2014 | Kateley | H04W 24/02 455/424 |
| 2017/0230846 | A1* | 8/2017 | Wang | H04W 24/04 |
| 2019/0036630 | A1* | 1/2019 | Svennebring | H04W 40/12 |
| 2019/0319868 | A1* | 10/2019 | Svennebring | H04L 43/0882 |
| 2020/0127901 | A1* | 4/2020 | Hariharan | H04B 17/336 |
| 2021/0288731 | A1* | 9/2021 | Yun | H04B 17/318 |
| 2021/0384994 | A1* | 12/2021 | Borges | G01S 5/02521 |
| 2022/0046466 | A1* | 2/2022 | Sridhar | H04L 47/11 |

* cited by examiner

*Primary Examiner* — Philip C Lee

(57) ABSTRACT

A method, a device, and a non-transitory storage medium are described in which a network performance spread service is provided. The service may include generating a dependency graph representative of a network and identifying current or prospective poor performance spread of network elements based on correlations between the network elements and performance data. The service may also include providing remedial services that address the poor performance spread in the network.

20 Claims, 11 Drawing Sheets

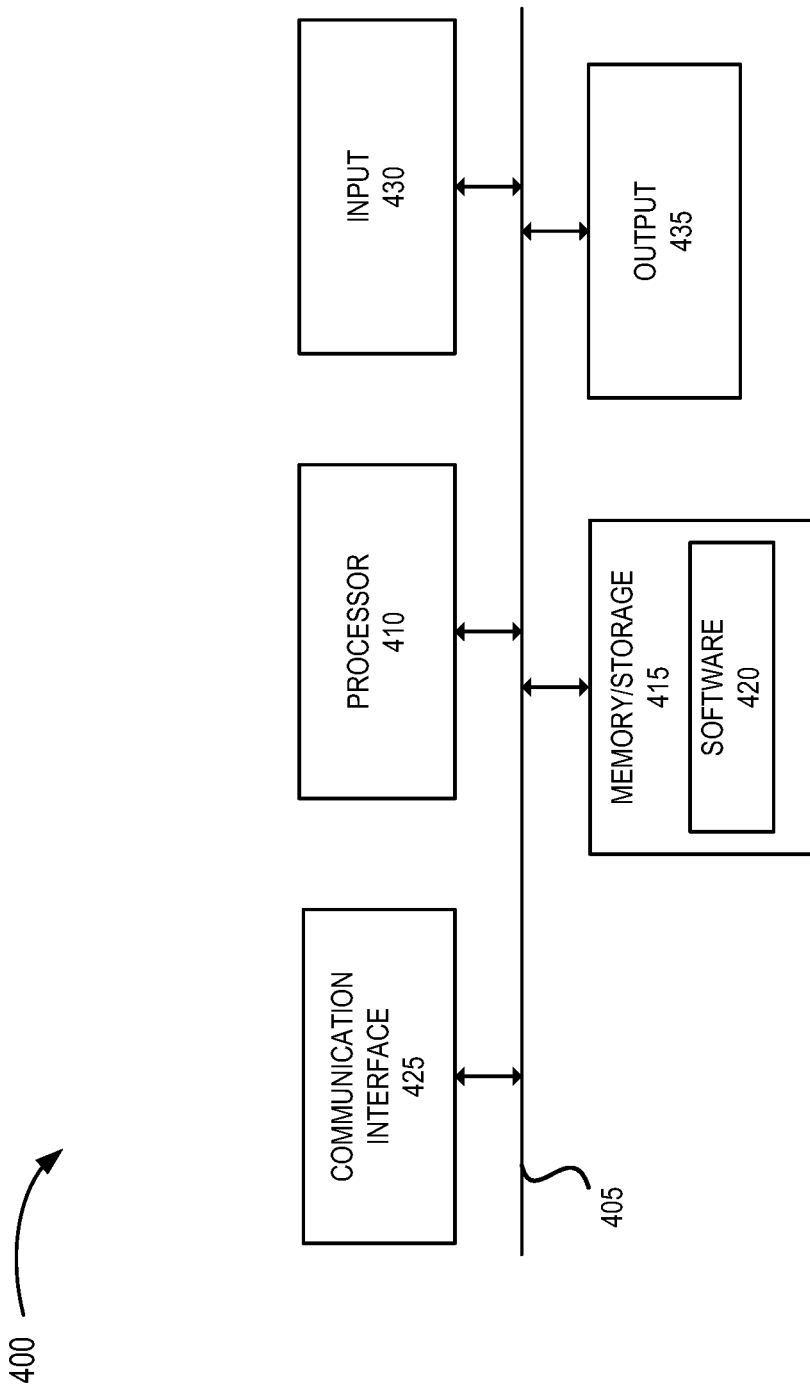

NETWORK PERFORMANCE SPREAD SERVICE

BACKGROUND

Development and design of networks present certain challenges from a network-side perspective and an end device perspective. For example, Next Generation (NG) wireless networks, such as Fifth Generation New Radio (5G NR) networks are being deployed and under development.

BRIEF DESCRIPTION OF THE DRAWINGS

FIG. 4 is a diagram illustrating exemplary components of a device that may correspond to one or more of the devices illustrated and described herein;

DETAILED DESCRIPTION

Figure 1:
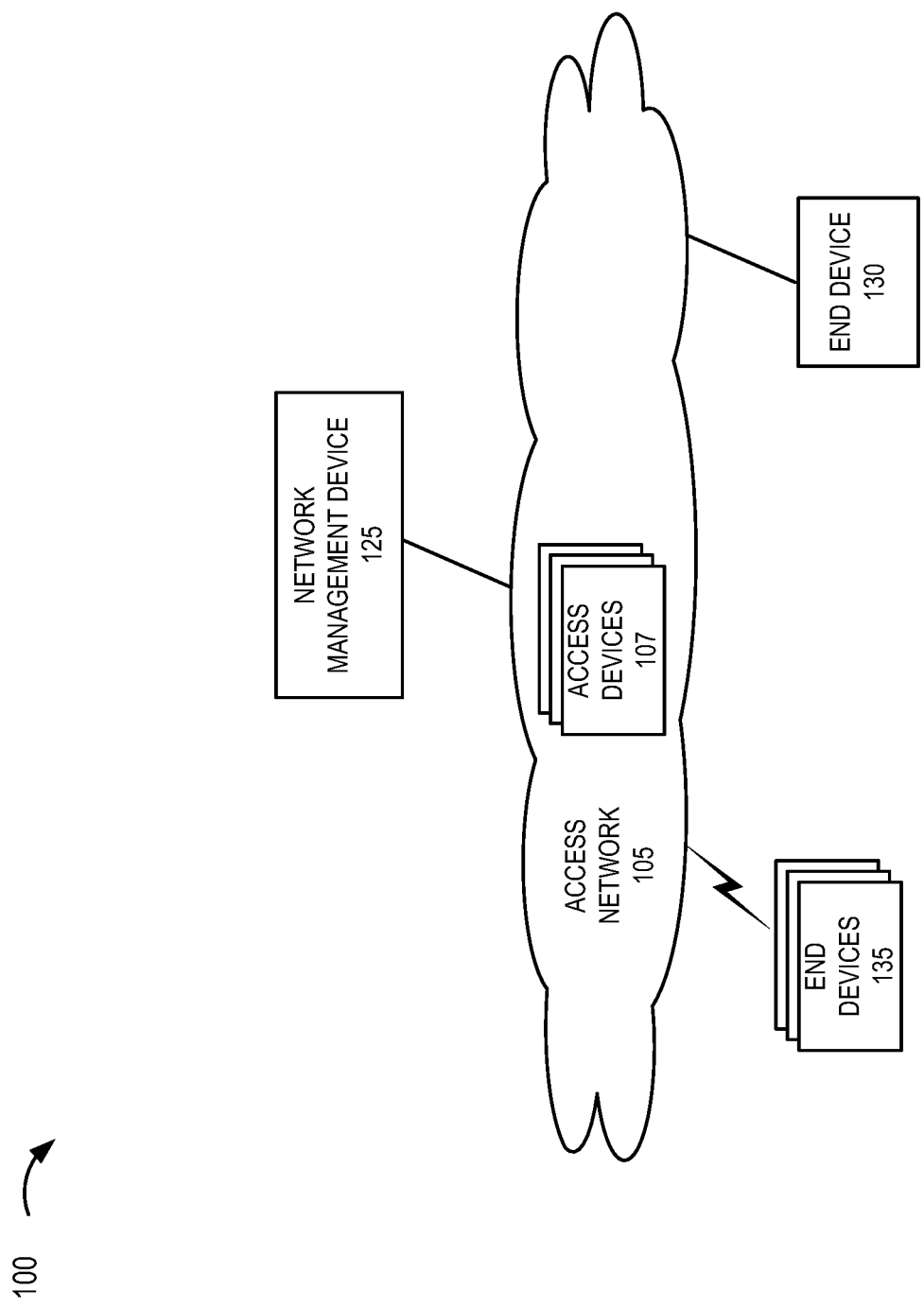
FIG. 1 is a diagram illustrating an exemplary environment in which an exemplary embodiment of a network performance spread service may be implemented.

The following detailed description refers to the accompanying drawings. The same reference numbers in different drawings may identify the same or similar elements. Also, the following detailed description does not limit the invention.

The ability to understand network weak points, poorly performing network devices, and/or network device conflicts within a wireless network can be technically challenging, as well as their impact on other network devices in the wireless network. Consequently, the ability to apply remedial measures to these aspects of network management in way that addresses or minimizes the current and prospective negative impacts on network performance is equally problematic.

According to exemplary embodiments, a network performance spread service is described. According to an exemplary embodiment, the network performance spread service may be applied to a radio access network (RAN). According to another exemplary embodiment, the network performance spread service may apply to another type of network, such as a core network, an application layer network, which may be in addition to or in combination with the radio access network. According to an exemplary embodiment, the network performance spread service may include an analytics service that identifies or determines network performance spread in a network, as described herein. The network performance spread may be current or prospective. According to an exemplary embodiment, the network performance spread service may include a remediation service that mitigates or prevents a degradation or impairment in the network associated with the network performance spread, as described herein.

According to an exemplary embodiment, the network performance spread service may generate a graph representative of a network or a portion thereof. For example, the graph may include vertices that represent network devices or cells, and edges that may represent relationships between the vertices. According to an exemplary embodiment, the network performance spread service may identify dependencies or relationships between vertices based on location, historical performance data, size and coverage of the network device, handover data, and/or other types of information, as described herein.

According to an exemplary embodiment, the network performance spread service may identify direct and partial correlations between network devices. For example, the network performance spread service may calculate a Pearson correlation coefficient. According to other examples, the network performance spread service may calculate a correlation based on other methods, as described herein.

According to an exemplary embodiment, the network performance spread service may analyze the direct and partial correlations and identify poor performance spread based on positively correlated, negatively correlated, and no or zero correlated network devices. According to an exemplary embodiment, the network performance spread service may invoke and/or perform a remedial procedure in response to the identified poor performance spread, as described herein.

In view of the foregoing, the network performance spread service may improve network management tasks that may relate to poor performance spread impact within a network. For example, the network performance spread service may identify ripple effects, prioritize repairs, determine root causes and vulnerabilities within the network.

FIG. 1 is a diagram illustrating an exemplary environment 100 in which an exemplary embodiment of network performance spread service may be implemented. As illustrated, environment 100 includes an access network 105. Access network 105 may include access devices 107 (also referred to individually or generally as access device 107). Environment 100 may include a network management device 125 and an end device 130. Environment 100 may further include end devices 135 (also referred to individually or generally as end device 135).

The number, type, and arrangement of networks illustrated in environment 100 are exemplary. For example, according to other exemplary embodiments, environment 100 may include additional networks and/or different networks. For example, according to other exemplary embodiments, other networks not illustrated in FIG. 1 may be included, such as an X-haul network (e.g., backhaul, midhaul, fronthaul, etc.), and/or a transport network (e.g., Signaling System No. 7 (SS7), etc.).

Additionally, or alternatively, environment 100 may include a core network, an external network, or another type of network that may support a wireless service and/or provide an application service, as described herein. For example, the core network may include a complementary network of access network 105, such as a Fifth Generation (5G) core network, an evolved packet core (EPC) of a Long Term Evolution (LTE) network, an LTE-Advanced (LTE-A) network, and/or an LTE-A Pro network, a future generation core network (e.g., a 5.5G, a Sixth Generation (6G), a Seventh Generation (7G), or another generation of core network), and/or another type of core network. Also, for example, the external network may be implemented to include a service or an application layer network, a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a software defined network (SDN), a virtual network, a packet-switched network, a data center, or other type of network that may provide access to and may host an end device application service, such as IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., SDN, virtual, logical, network slice, etc.). The number, the type, and the arrangement of network devices and end device 130 are exemplary.

Environment 100 includes communication links between the network devices, and between end device 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G RAN, a future generation RAN (e.g., a 6G RAN, a 7G RAN, or a subsequent generation RAN), a centralized-RAN (C-RAN), and/or another type of access network. Access network 105 may include a legacy RAN (e.g., a Third Generation (3G) RAN, a Fourth Generation (4G) or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, as well as other types of networks (e.g., an external network, a core network, etc.).

Access network 105 may include different and multiple functional splitting, such as options 1, 2, 3, 4, 5, 6, 7, or 8 that relate to combinations of access network 105 and a core network including, for example, an evolved packet core (EPC) network and/or an 5G core network, or the splitting of the various layers (e.g., physical layer, medium access control (MAC) layer, radio link control (RLC) layer, packet data convergence protocol (PDCP) layer, and/or other layers), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, and the like).

According to some exemplary embodiments, access network 105 may be implemented to include various architectures of wireless service, such as, for example, 5G, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, carrier frequencies, and segments of radio spectrum (e.g., cm wave, mm wave, below 6 gigahertz (GHz), above 6 GHz, higher than mm wave, C-band, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

Network management device 125 may include logic that provides one or multiple operations, in whole or in part, of an exemplary embodiment of the network performance spread service, as described herein. Although network management device 125 is depicted outside of access network 105, such an illustration is exemplary. According to other exemplary implementations, network management device 125 may or may not reside in access network 105 and/or other types of networks (e.g., core, external, backhaul, etc.), as described herein. Additionally, although network management device 125 is depicted as having a link to access network 105 such an illustration is exemplary. According to other exemplary implementations, network management device 125 may have additional and/or different links than those depicted. According to various exemplary embodiments, network management device 125 may be included in and/or communicatively coupled to an operations support system (OSS), a business support system (BSS), a network management system, a network performance management system, or the like.

End device 130 may include logic that provides one or multiple operations, in whole or in part, of an exemplary embodiment of the network performance spread service, as described herein. End device 130 may be implemented as a computer, such as a desktop, a laptop, a terminal, or the like, for example. According to some exemplary embodiments, end device 130 may include a client that may communicatively couple end device 130 to network management device 125. In this regard, according to some exemplary embodiments, the network performance spread service may be cooperatively implemented by end device 130 and network management device 125. According to other exemplary embodiments, the network performance spread service may be implemented by only end device 130 or only network management device 125. According to such exemplary embodiments, environment 100 may not include end device 130 or network management device 125.

End device 135 may include a device that may have computational and/or communication capabilities (e.g., wireless, wired, optical, etc.). End device 135 may be implemented as a mobile device, a portable device, a stationary device (e.g., a non-mobile device and/or a non-portable device), a device operated by a user, or a device not operated by a user. For example, end device 135 may be implemented as a smartphone, a mobile phone, a personal digital assistant, a tablet, a netbook, a wearable device (e.g., a watch, glasses, etc.), a computer, a gaming device, a music device, an IoT device, a drone, a smart device, or other type of wireless device (e.g., other type of user equipment (UE)). End device 135 may be configured to execute various types of software (e.g., applications, programs, etc.). The number and the types of software may vary among end devices 135. End devices 135 may include "edge-aware" and/or "edge-unaware" application service clients. End device 135 is not to be considered a network device, as described herein. End device 135 may be associated with a user that subscribes to a wireless service of access network 105.

End device 135 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, cm wave, etc.), various levels and genres of network slicing, DC service, CA service, and/or other types of connectivity services. Additionally, end device 135 may include one or multiple communication interfaces that provide one or multiple (e.g., simultaneous, interleaved, etc.) connections via the same or different RATs, frequency bands, carrier frequencies, network slices, and/or via another communication medium (e.g., wired, etc.). The multimode capabilities of end device 135 may vary among end devices 135.

According to an exemplary embodiment, at least a portion of access devices 107 may include network performance spread service logic and an interface that supports the network performance spread service, as described herein. According to an exemplary embodiment, network devices of other types of networks (e.g., a core network, an external network, an X-haul network, or another type of network) may include network performance spread service logic and an interface that supports the network performance spread service, as described herein.

FIGS. 2A-2E are diagrams illustrating an exemplary process 200 of an exemplary embodiment of the network performance spread service. According to this exemplary embodiment, process 200 may be performed by network management device 125. According to this example, the network performance spread service may pertain to access network 105.

Figure 2A:
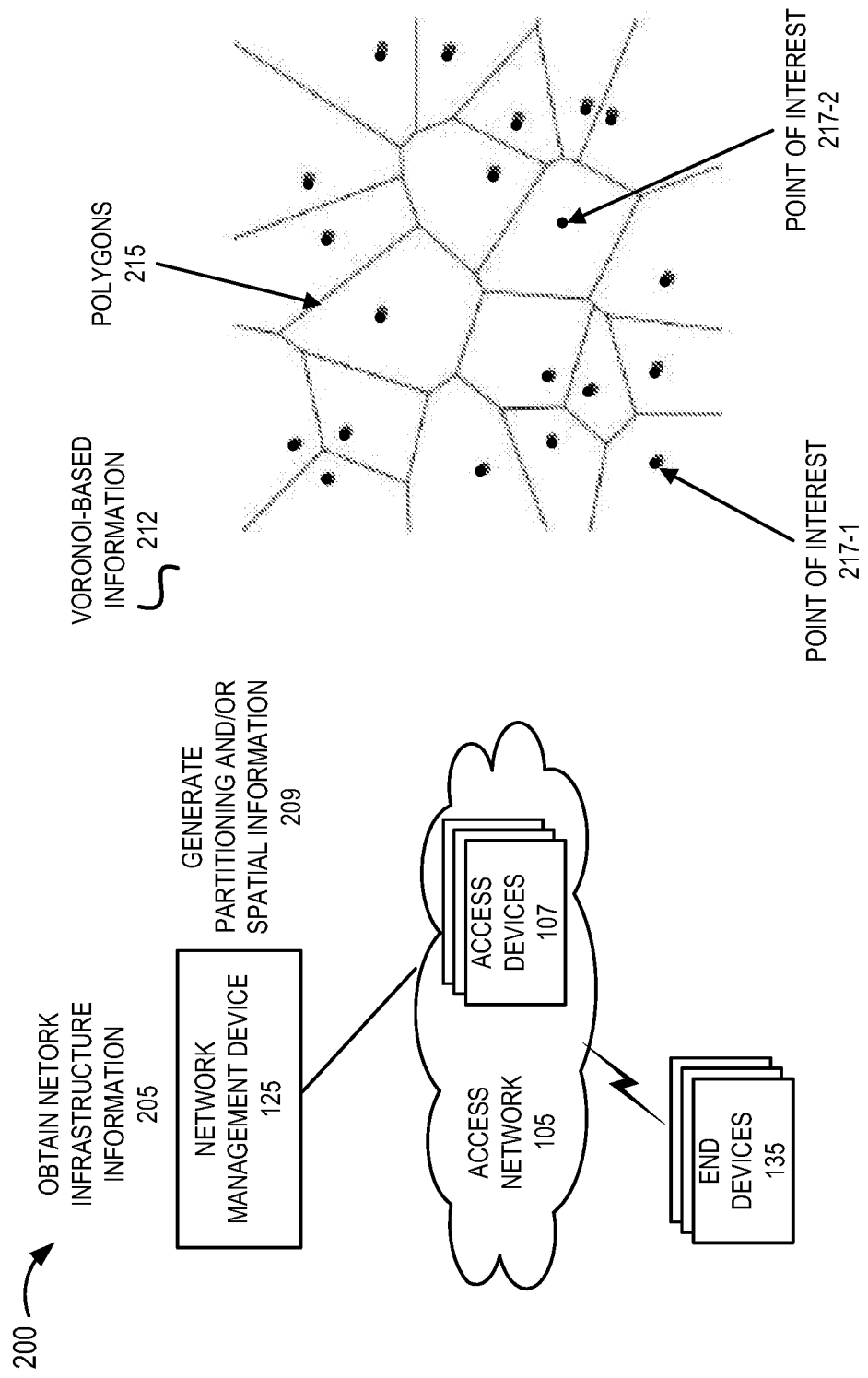
FIGS. 2A-2E are diagrams illustrating an exemplary process of an exemplary embodiment of the network performance spread service.

Referring to FIG. 2A, process 200 may include network management device 125 obtaining network infrastructure information 205. For example, the network infrastructure information may include location information pertaining to access devices 107. For example, the location information may include geographic coordinates (e.g., latitude/longitude values) of a geographic coordinate system (GCS), or coordinate values associated with another type of coordinate system (e.g., a projected coordinate system (PCS), etc.). The location information may also include other parameter values relating to azimuth, vertical angle, elevation, and/or other similar parameter values. Also, the network infrastructure information may include information relating to components of access devices 107, such as antennas (e.g., height, geographic location, number, type, gain, transmit loss, receive loss, receive signal, fade margin (e.g., thermal, effective, etc.), and other characteristics (e.g., carrier frequencies, frequency bands, cells, RAT, cell coverage, etc.) or configurations (e.g., CA, DC, CoMP, etc.) of access devices 107, such as type of access device 107 (e.g., eNB versus gNB, etc.). The network infrastructure information may also include map information. For example, the map information may include a map of a geographic area (e.g., country, state, county, city, etc.). The map information may also include an overlay of where access devices 107 may be situated in a geographic area.

Based on the network infrastructure information, network management device 125 may generate partitioning and/or spatial information 209. For example, according to an exemplary embodiment, network management device 125 may generate Voronoi-based information 212. For example, network management device 125 may include logic that generates the Voronoi-based information 212, such as Fortune's algorithm, another known algorithm, or a proprietary algorithm. According to other exemplary embodiments, other algorithms or methods may be implemented, which may use cell coverage information, propagation simulation information, and/or network KPIs (or other types of metrics, as described herein) pertaining to wireless coverage of access devices 107.

As illustrated, Voronoi-based information 212 may indicate (Voronoi) polygons, cells, or regions 215 that may be centered around points of interest 217, such as point of interest 217-1 and point of interest 217-2. The points of interest illustrated in FIG. 2A of Voronoi-based information 212 may be indicative of access devices 107 and/or cells of access devices 107, for example.

Figure 2B:
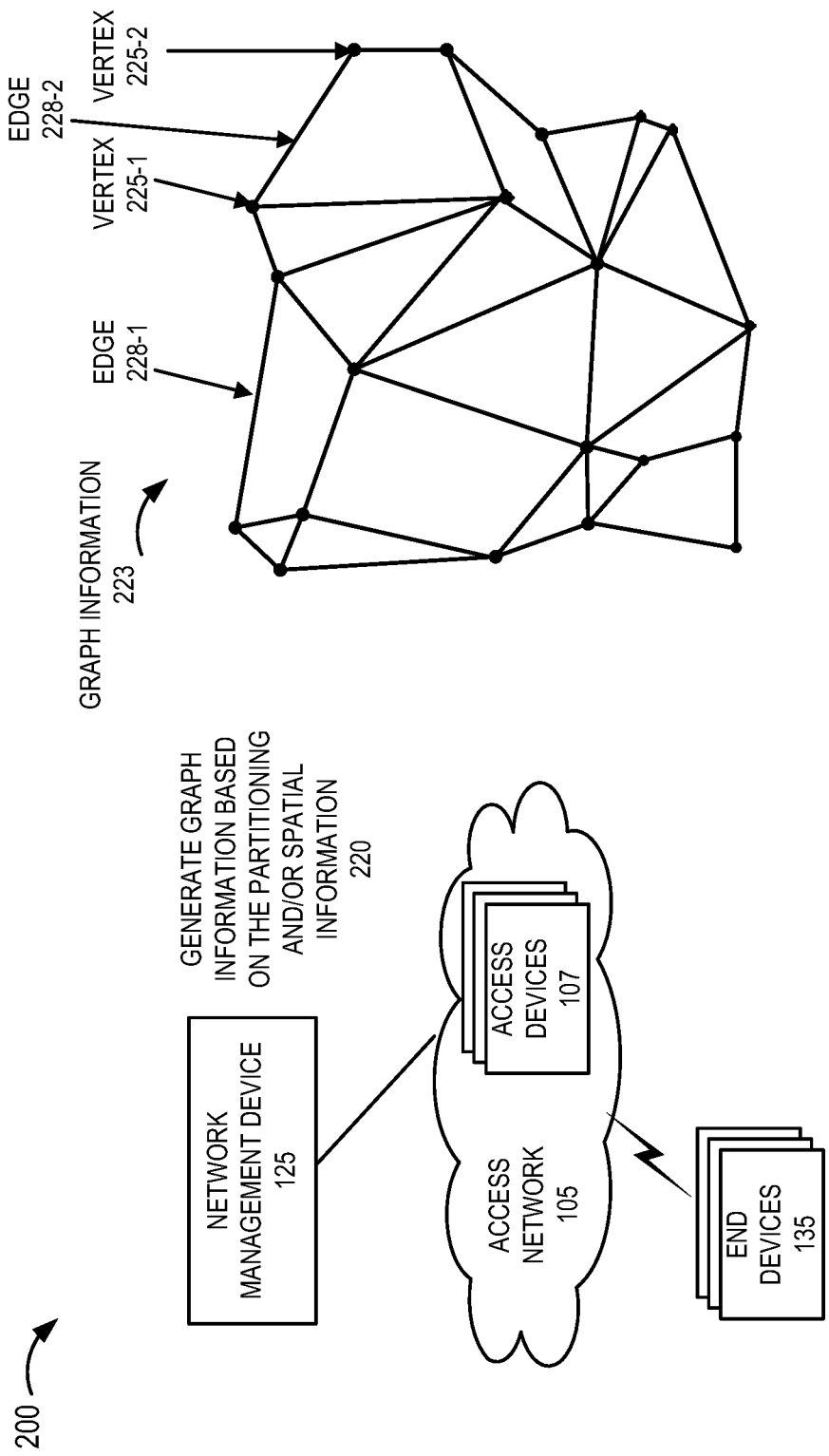

Referring to FIG. 2B, network management device 125 may generate graph information based on the partitioning and/or spatial information 220. For example, network management device 125 may generate the graph information based on points of interest 217 and the boundaries defined by the polygons, cells, or regions 215. For example, as illustrated in FIG. 2B, a graph 223 may include vertices 225, such as a vertex 225-1 and a vertex 225-2, and edges 228, such as an edge 228-1 and an edge 228-2. Vertices 225 may correspond to points of interest 217 and edges 228 may indicate candidate relationships between vertices 225. The graph information may be implemented to include a dependency network/graph, for example.

Figure 2C:
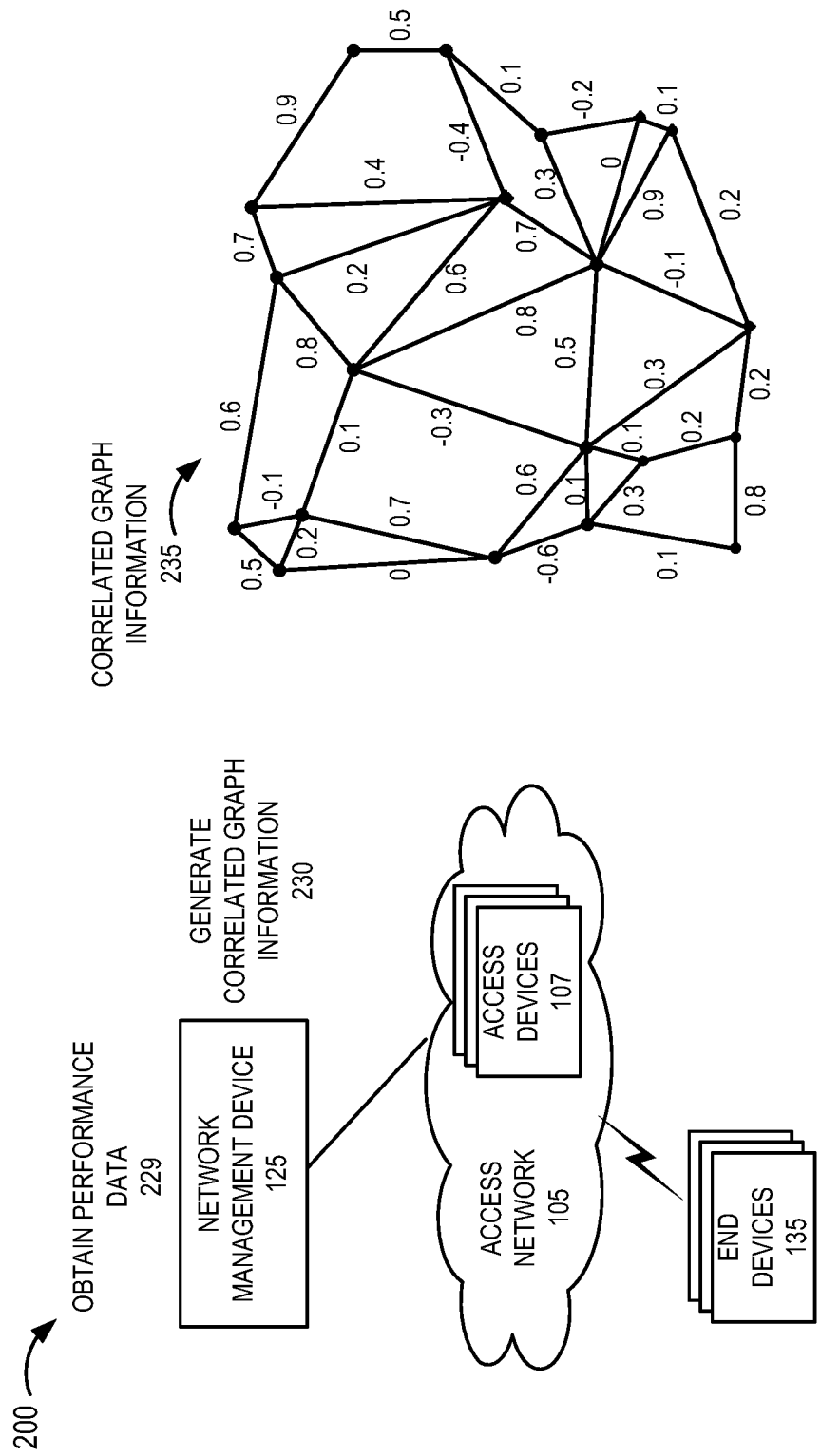

Referring to FIG. 2C, network management device 125 may obtain performance data 229. According to various exemplary embodiments, the performance data may include various types of performance data that may be obtained from and/or may pertain to access devices 107, end devices 135, or both over a configurable time period. For example, the performance data may include key performance indicators (KPIs), Quality of Service (QoS) values, Quality of Experience (QoE) values, and/or Mean Opinion Score (MOS) values. By way of further example, the performance data may relate to the performance associated with user sessions, connections, channels, messaging, a network procedure (e.g., attachment, handover, session establishment, dual connectivity, etc.), and/or other types of metrics of the wireless service in relation to access devices 107, access devices 107 and end devices 135, or an element of access device 107 (e.g., a frequency band, a carrier, a sector, or the like). As an example, the performance data may include information relating to Radio Resource Control (RRC) setup failures, handover attempts, handover failures, radio bearer drops, uplink and/or downlink throughput, voice call drops, random access failures, data volume, peak or average of connected end devices 135, average uplink interference, latency, packet error, delay, bit rates (e.g., guaranteed, maximum, burst, etc.), jitter, retries, percentage of use of sub-optimal modulation schemes (e.g., Quadrature Phase Shift Keying, etc.), 5G QoS Class Identifiers (QCIs), and so forth.

Based on the performance data and graph information 223, network management device 125 may generate correlated graph information 230. For example, network management device 125 may calculate a correlation between access devices 107 associated with vertices 225 based on the performance data. According to an exemplary embodiment, network management device 125 may calculate the correlation based on the Pearson Correlation Coefficient between access devices 107. According to other exemplary embodiments, network management device 125 may use other types of correlation methods, such as the Spearman Correlation Coefficient, Kendall rank correlation coefficient, or other types of correlation or coefficients (e.g., Phi Coefficient, Cramer's V Correlation, Concordance Correlation Coefficient (CCC), or the like). According to still other exemplary embodiments, network management device 125 may identify a degree of dependency of indirectly connected access devices 107 relative to a main or focal access device 107, as described herein. Network management device 125 may select one or multiple types, values, or instances of performance data on which the correlation may be calculated. As illustrated in FIG. 2C, exemplary correlated graph information 235 is illustrated in which exemplary values are associated with edges 228 indicative of calculated correlations between vertices 225, for example. According to this example, the values are normalized between −1 and 1 in which positive values may be indicative of a positive correlation, negative values may be indicative of a negative correlation, and 0 may indicate no correlation. According to other correlation methods, the values and their indicative correlation may be different.

Figure 3A:
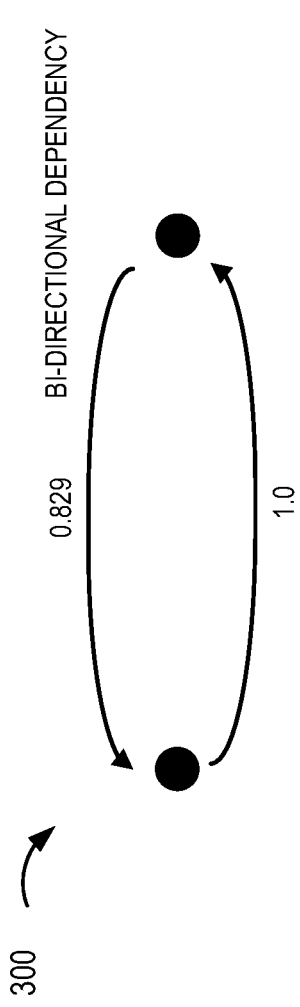
FIGS. 3A-3C are diagrams illustrating exemplary dependencies.
Figure 3B:
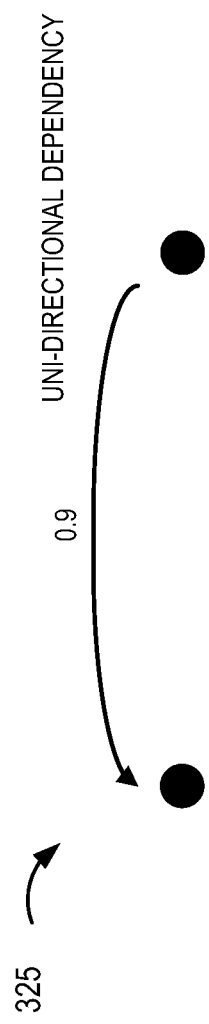
Figure 3C:
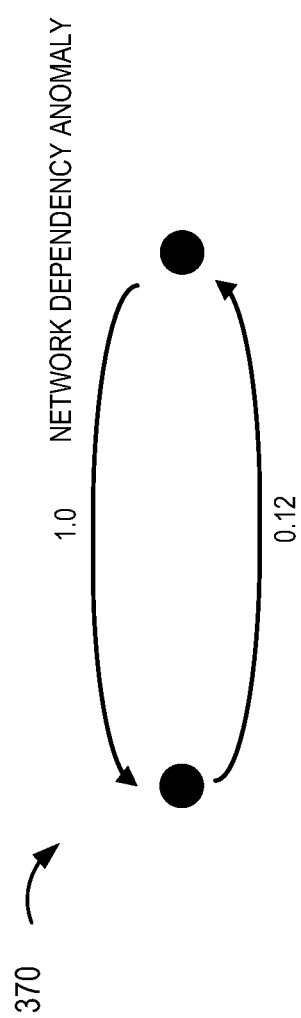

The correlated graph information 235 may include directed graph information or undirected graph information, for example. For example, referring to FIGS. 3A and 3B, between two or more vertices (e.g., access devices 107), there may be a bidirectional dependency 300 or a unidirectional dependency 325 associated with the exemplary correlation values. Additionally, as illustrated in FIG. 3C, the network performance spread service may identify a (potential) network dependency anomaly 370. For example, there may be a high handover failure or number of handovers from one cell to another cell, but a low handover failure or number of handovers from the other cell to the one cell, which are associated with the exemplary correlation values depicted.

Figure 2D:
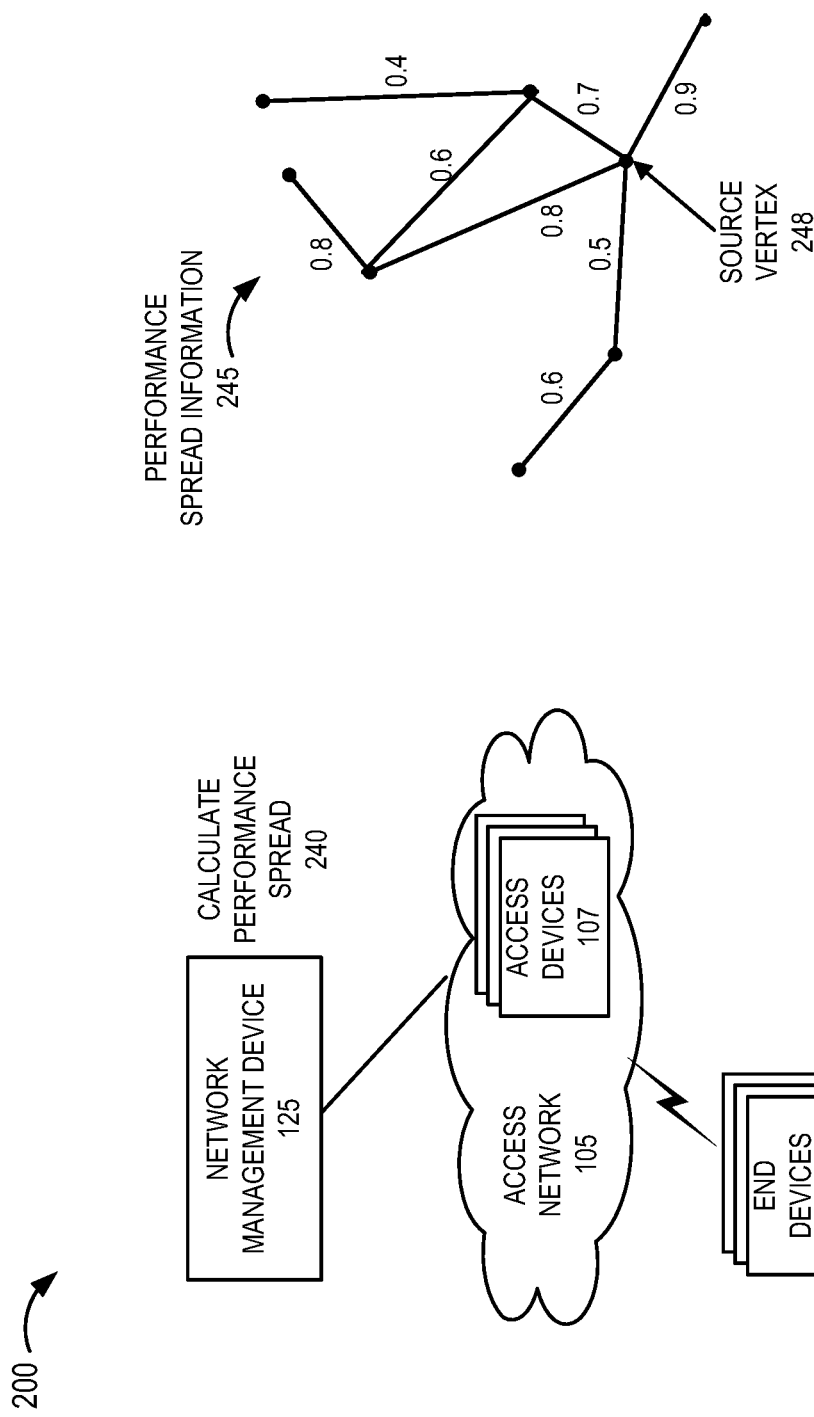

Referring to FIG. 2D, network management device 125 may calculate a performance spread 240. The performance spread may indicate a ripple-effect associated with a KPI and/or other performance metric associated with a source access device 107 and neighboring access devices 107. As described herein, the performance spread may be calculated based on correlation values. For example, based on the correlated graph information 230, network management device 125 may calculate direct, partial, and/or marginal correlations between a target or source access device 107 or vertex 225 relative to other access devices 107 or other vertices 225. According to some exemplary embodiments, network management device 125 may be configured with a maximum number of edges or a distance value for which the performance spread is to be calculated relative to the source (e.g., main, focal) vertex 225, for example.

According to an exemplary embodiment, network management device 125 may determine the performance spread based on identifying positively correlated links. According to some exemplary embodiments, the positive correlation may have to satisfy a correlation threshold value. According to some exemplary embodiments, the correlation threshold value may be performance data specific. For example, the correlation threshold value may differ between handover failures versus the radio bearer drops. Additionally, or alternatively, the correlation threshold value may be the same among at least some of the different types of performance data criteria. The correlation threshold values applied may also be based on other criteria, such as geographic area in which a source vertex and surrounding vertices are situated, time of day, population density associated with the geographic area (e.g., rural, city, etc.), and/or other configurable factors. Additionally, for example, the correlation threshold values may be dynamic based on day and/or time information of relevance, for example. According to other exemplary embodiments, network management device 125 may determine performance spread and/or other associations among access devices 107 based on negatively correlated links, or some combination of positively correlated links and negatively correlated links. Additionally, network management device 125 may evaluate the interplay between correlations among different performance metrics, KPIs, QoS, and so forth, such as handover failure and latency and/or throughput, for example, associated with access devices 107.

Referring to FIG. 2D, exemplary performance spread information 245 is illustrated. Performance spread information 245 may include data indicating a (candidate) source vertex (e.g., a source vertex 248) and the surrounding vertices (e.g., neighboring access devices 107) that pertain to the determined performance spread. According to various exemplary embodiments, the network performance spread service may select the source or main vertex (e.g., source or main access device 107) according to different approaches or criteria. For example, according to an exemplary implementation, the network performance spread service may select the source vertex based on the total number of different performance data instances that may be considered poor (e.g., according to threshold values for the different performance data instances). According to another exemplary implementation, the network performance spread service may select the source vertex based on a timing factor. For example, the source vertex may be identified based on when and to which vertex the poor performance data occurs first in time. According to other exemplary implementations, the network performance spread service may select the source vertex based on other types of configurable criteria, such as a re-occurrence factor, a process of elimination among multiple candidate vertices/access devices 107, the vertex with the worst performance data value(s) among other vertices associated with the performance spread, and so forth.

Figure 2E:
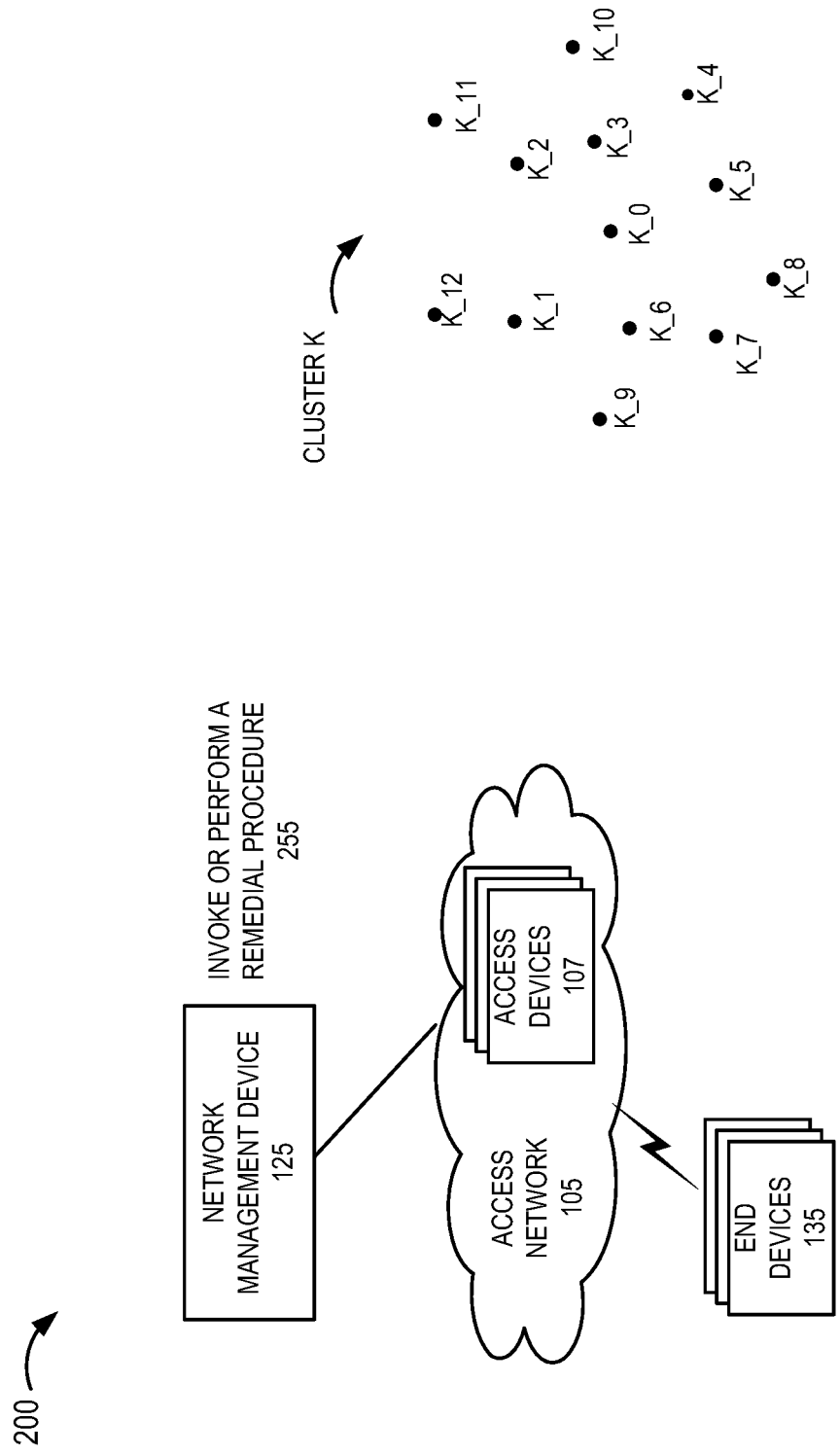

Referring to FIG. 2E, based on the performance spread information 245, network management device 125 may invoke or perform a remedial procedure 255. For example, a response to a poor performance spread may be integrated into an automated network configuration change management system so that a configuration change may be implemented in a network, such as access network 105. According to various exemplary embodiments, the remedial procedure may be directed to some or all access devices 107 of relevance to the poor performance spread or a single access device 107 that may be responsible for a rippling effect, for example. As an example, a cell K0 may be a part of a cluster K, which may include other cells (e.g., K1-K12). Network management device 125 may detect a performance spread issue starting at T_0 that is impacting cells K1, K3, and K6 most strongly. For example, cell K0 has an increase in handover failures as well as a decrease in handover attempts, while cells K1, K3, and K6 each may have an increase in RRC reestablishment attempts without any change to handover failures or other metrics of interest. Network management device 125 or another network device (not illustrated) may determine that cell K0 has had a configuration change to a parameter that may be a root cause. For example, the parameter may be used to filter cell measurement reports from end devices 135. Based on this information, network management device 125 may issue a rollback command to the automated network configuration change management system to have cell K0 to rollback or revert the change to the value of the parameter. Subsequent to the parameter value change, network management device 125 may determine that the poor performance spread issue has been resolved.

As previously described, the network performance spread service may perform other remedial processes or remedial analysis, such as understanding a network weak point (e.g., a most vulnerable access device 107 to be subject to poor performance/degradation associated with a KPI, etc.), identifying a network conflict (e.g., one access device 107 performs well when another access device 107 performs poorly), prioritizing repairs or re-configuration of access devices 107 to those access devices 107 that may have the highest positive impact in the wireless network, and minimizing and/or preventing the ripple effect by improving or completely fixing a focal or main access device 107 which may propagate and cause issues with neighboring access devices 107.

FIG. 4 is a diagram illustrating exemplary components of a device 400 that may be included in one or more of the devices described herein. For example, device 400 may correspond to access device 107, network management device 125, end device 130, end devices 135, and/or other types of devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to network management device 125, software 420 may include an application that, when executed by processor 410, provides a function and/or a process of network performance spread service, as described herein. Additionally, with reference to end device 130, software 420 may include an application that, when executed by processor 410, provides a function and/or a process of network performance spread service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
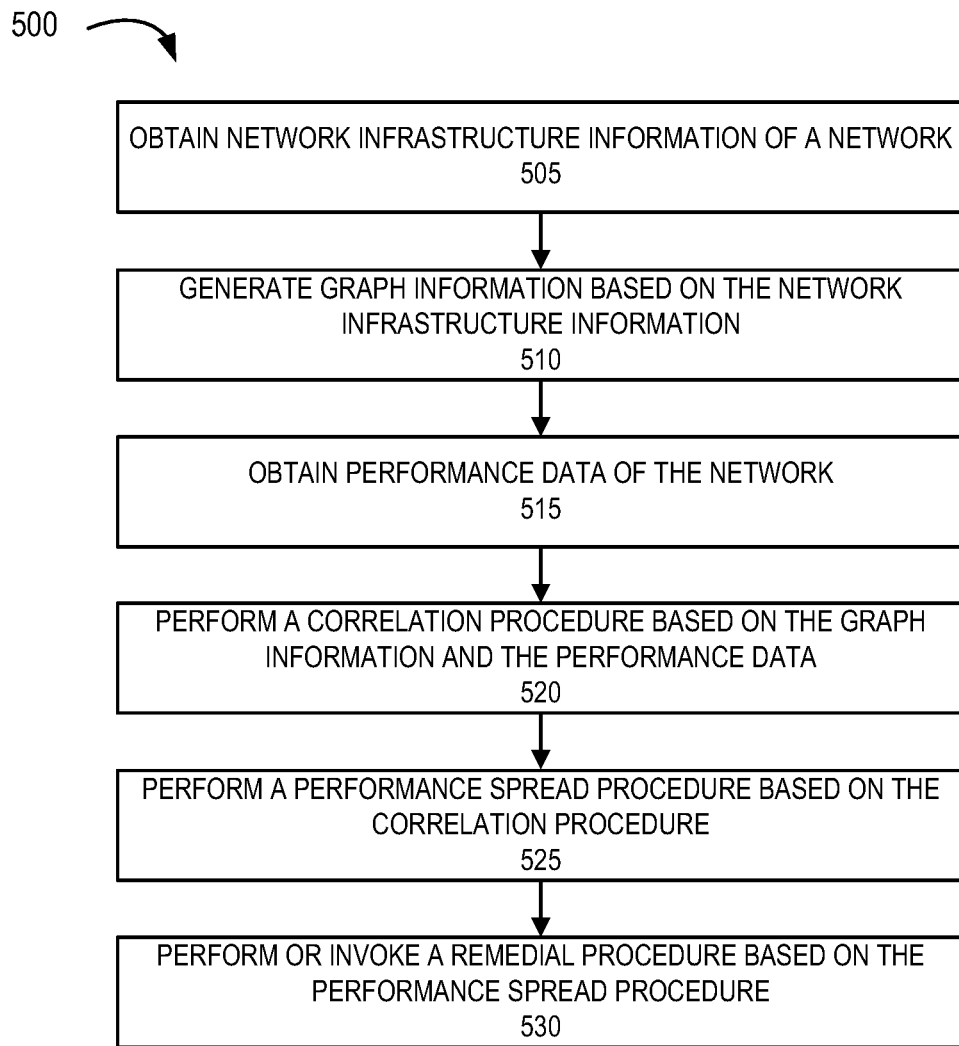
FIG. 5 is a flow diagram illustrating an exemplary process of an exemplary embodiment of a network performance spread service.

FIG. 5 is a flow diagram illustrating an exemplary process 500 of an exemplary embodiment of network performance spread service. According to an exemplary embodiment, network management device 125 may perform a step of process 500. According to another exemplary embodiment, end device 130 may perform a step of process 500. According to other exemplary embodiments, a step of process 500 may be cooperatively performed by network management device 125 and end device 130. According to an exemplary implementation, processor 410 executes software 420 to perform the step of process 500, as described herein. Alternatively, the step may be performed by execution of only hardware.

Referring to FIG. 5, in block 505, network infrastructure information of a network may be obtained. In block 510, graph information may be generated based on the network infrastructure information. In block 515, performance data of the network may be obtained.

In block 520, a correlation procedure may be performed based on the graph information and the performance data. In block 525, a performance spread procedure may be performed based on the correlation procedure. In block 530, a remedial procedure may be invoked or performed based on results of the performance spread procedure.

FIG. 5 illustrates an exemplary embodiment of a process of network performance spread service, according to other exemplary embodiments, the network performance spread service may perform additional operations, fewer operations, and/or different operations than those illustrated and described.

Figure 6:
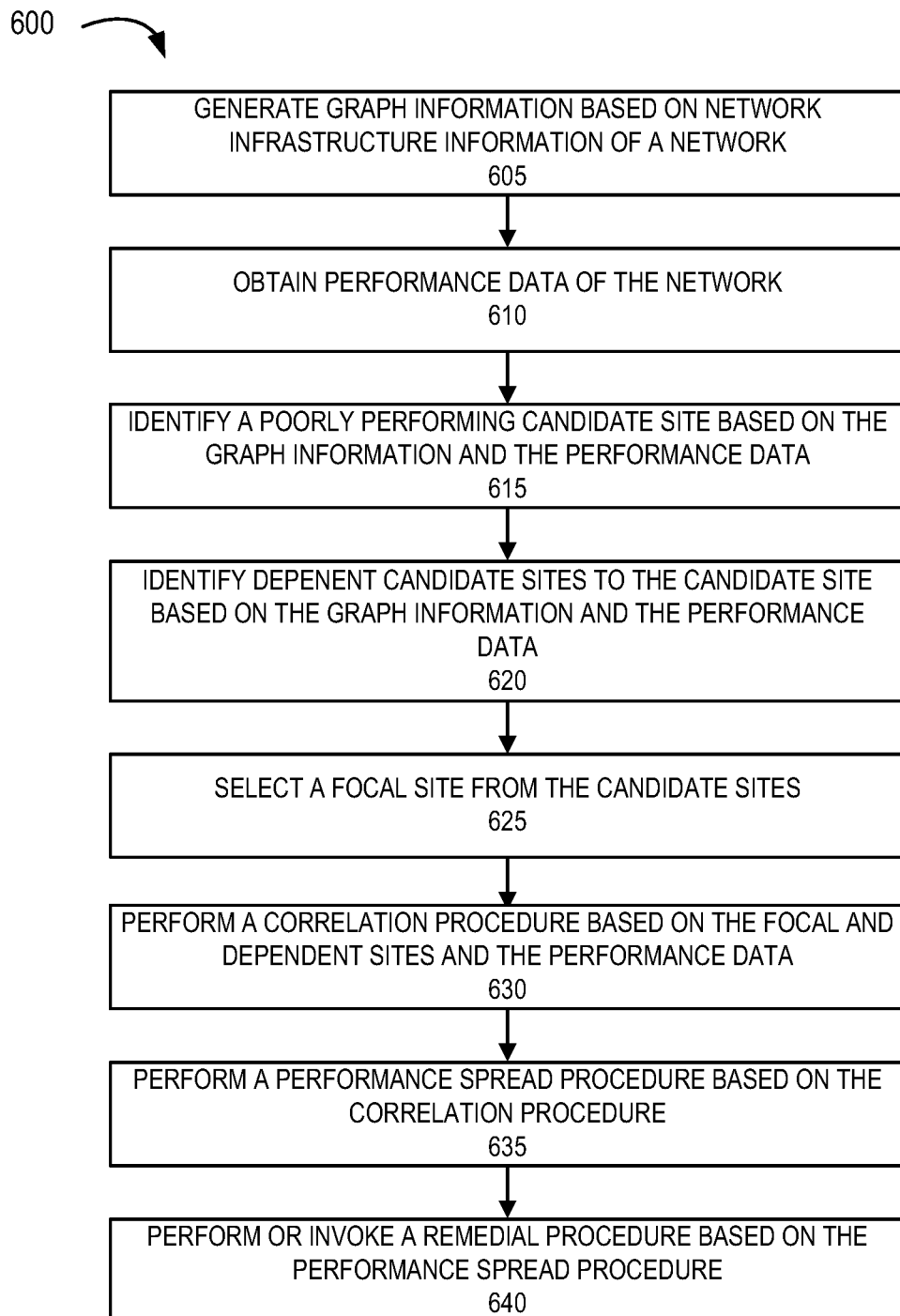
FIG. 6 is a flow diagram illustrating another exemplary process of an exemplary embodiment of a network performance spread service.

FIG. 6 is a flow diagram illustrating an exemplary process 600 of an exemplary embodiment of network performance spread service. According to an exemplary embodiment, network management device 125 may perform a step of process 600. According to another exemplary embodiment, end device 130 may perform a step of process 600. According to other exemplary embodiments, a step of process 600 may be cooperatively performed by network management device 125 and end device 130. According to an exemplary implementation, processor 410 executes software 420 to perform the step of process 600, as described herein. Alternatively, the step may be performed by execution of only hardware.

Referring to FIG. 6, in block 605, graph information may be generated based on network infrastructure information of a network. In block 610, performance data of the network may be obtained. In block 615, a poorly performing candidate site may be identified based on the graph information and the performance data. For example, access device 107 may be identified as a poorly performing site based on a KPI over a configured time period. In block 620, dependent candidate sites may be identified based on the graph information and the performance data. For example, other access devices 107 may be identified that are poorly performing based on the KPI over the configured time period or a modified time period (e.g., expanded or reduced). According to some exemplary implementations, the time period may be based on an onset time associated with the identification of the poorly performing candidate site in block 615. In block 625, a focal or main site may be selected from the candidate sites. For example, the number of poorly performing KPIs may be used as a metric in which a candidate access device 107 with the most poorly performing KPIs may be selected as the focal or main site. In the event of a tie, the candidate access device 107 with the most severe KPI degradation may be selected. As previously mentioned, other criteria may be used to select the main or focal site. In block 630, a correlation procedure may be performed based on the graph information and the performance data. For example, a Pearson correlation and/or another type of correlation procedure may be performed for every combination of dependent and main KPI. In block 635, a performance spread procedure may be performed based on the correlation procedure. For example, sites with poorly performing KPIs with the highest correlation and/or other criterion (e.g., satisfies a threshold value, etc.) may be analyzed together as a performance spread. In block 640, a remedial procedure may be invoked or performed based on results of the performance spread procedure.

FIG. 6 illustrates an exemplary embodiment of a process of network performance spread service, according to other exemplary embodiments, the network performance spread service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   generating, by a device, graph information based on network infrastructure information of a network;
   obtaining, by the device, performance data of the network;
   performing, by the device, a correlation procedure based on the graph information and the performance data;
   performing, by the device, a performance spread procedure based on the correlation procedure and identifying a performance spread in the network based on positively correlated links between vertices of the graph information; and
   performing or invoking, by the device, a remedial procedure with respect to the network based on the performance spread procedure.

2. The method of claim 1, wherein the correlation procedure includes calculating a Pearson correlation coefficient between radio access network (RAN) devices of the network.

3. The method of claim 1, wherein the performing of the performance spread procedure includes identifying the performance spread in the network based on negatively correlated links between the vertices of the graph information.

4. The method of claim 1, wherein the performing of the performance spread procedure includes selecting a focal radio access network (RAN) device of the network and dependent RAN devices based on the focal RAN device and associated correlations of the correlation procedure.

5. The method of claim 1, wherein the remedial procedure includes re-configuring one or more parameters of a radio access network (RAN) device that contributes to the performance spread in the network.

6. The method of claim 1, wherein the performance spread procedure includes calculating at least one of direct, partial, or marginal correlations between radio access network (RAN) devices relative to one or more types of the performance data.

7. The method of claim 1, wherein the performance data includes at least one of key performance indicators or quality of service values associated with the network and end devices connected to the network.

8. The method of claim 1, wherein the remedial procedure includes prioritizing repairs for radio access network (RAN) devices associated with the performance spread.

9. A device comprising:
a processor configured to:
generate graph information based on network infrastructure information of a network;
obtain performance data of the network;
perform a correlation procedure based on the graph information and the performance data;
perform a performance spread procedure based on the correlation procedure and identification of a performance spread in the network based on positively correlated links between vertices of the graph information; and
perform or invoke a remedial procedure with respect to the network based on the performance spread procedure.

10. The device of claim 9, wherein the correlation procedure includes calculating a Pearson correlation coefficient between radio access network (RAN) devices of the network.

11. The device of claim 9, wherein, when performing the performance spread procedure, the processor is further configured to:
identify the performance spread in the network based on positively negatively correlated links between the vertices of the graph information.

12. The device of claim 9, wherein, when performing the performance spread procedure, the processor is further configured to:
select a focal radio access network (RAN) device of the network and dependent RAN devices based on the focal RAN device and associated correlations of the correlation procedure.

13. The device of claim 9, wherein, when performing the remedial procedure, the processor is further configured to:
re-configure one or more parameters of a radio access network (RAN) device that contributes to the performance spread in the network.

14. The device of claim 9, wherein, when performing the performance spread procedure, the processor is further configured to:
calculate at least one of direct, partial, or marginal correlations between radio access network (RAN) devices relative to one or more types of the performance data.

15. The device of claim 9, wherein the performance data includes at least one of key performance indicators or quality of service values associated with the network and end devices connected to the network.

16. The device of claim 9, wherein, when performing the remedial procedure, the processor is further configured to:
prioritize repairs for radio access network (RAN) devices associated with the performance spread.

17. A non-transitory computer-readable storage medium storing instructions executable by a processor of a device, wherein the instructions are configured to:
generate graph information based on network infrastructure information of a network;
obtain performance data of the network;
perform a correlation procedure based on the graph information and the performance data;
perform a performance spread procedure based on the correlation procedure and identification of a performance spread in the network based on positively correlated links between vertices of the graph information; and
perform or invoke a remedial procedure with respect to the network based on the performance spread procedure.

18. The non-transitory computer-readable storage medium of claim 17, wherein the correlation procedure includes calculating a Pearson correlation coefficient between radio access network (RAN) devices of the network.

19. The non-transitory computer-readable storage medium of claim 17, wherein the instructions further comprise instructions configured to:
re-configure one or more parameters of a radio access network (RAN) device that contributes to the performance spread in the network.

20. The non-transitory computer-readable storage medium of claim 17, wherein the instructions further comprise instructions configured to:
prioritize repairs for radio access network (RAN) devices associated with the performance spread.

\* \* \* \* \*